(12) United States Patent
Maredi et al.

(10) Patent No.: US 12,670,075 B1
(45) Date of Patent: Jun. 30, 2026

(54) COMPUTING ACTION PROCESSING CHANNEL SELECTION

(71) Applicant: PAYPAL, INC., San Jose, CA (US)

(72) Inventors: Sharath Maredi, Medchal (IN);
Karthick Sundaram, Siruseri (IN)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 19/004,658

(22) Filed: Dec. 30, 2024

(51) Int. Cl.
  *G06F 11/14* (2026.01)
  *G06F 11/1446* (2026.01)
  *G06F 11/3698* (2025.01)

(52) U.S. Cl.
  CPC ...... *G06F 11/1469* (2013.01); *G06F 11/3698* (2025.01)

(58) Field of Classification Search
  CPC .................... G06F 11/1469; G06F 11/3698
  See application file for complete search history.

(56) References Cited

U.S. PATENT DOCUMENTS 7,441,045 B2 * 10/2008 Skene ................. H04L 61/4511
709/201

* cited by examiner

*Primary Examiner* — Jae U Yu
(74) *Attorney, Agent, or Firm* — Greenberg Traurig, LLP

(57) ABSTRACT

A computer-implemented method includes calculating a respective availability score for each of a plurality of backup computing action processing channels based on respective responses of the plurality of backup computing action processing channels to one or more of a plurality of test computing actions or a plurality of historical computing actions, receiving a requested computing action from a user, determining that a primary computing action processing channel cannot successfully process the requested computing action within one or more of a reliability threshold or a latency threshold, in response to determining that the primary computing action processing channel cannot successfully process the requested computing action, selecting a backup computing action processing channel from the plurality of backup computing action processing channels according to the availability scores, and transmitting the requested computing action to the selected backup computing action processing channel.

20 Claims, 4 Drawing Sheets

200

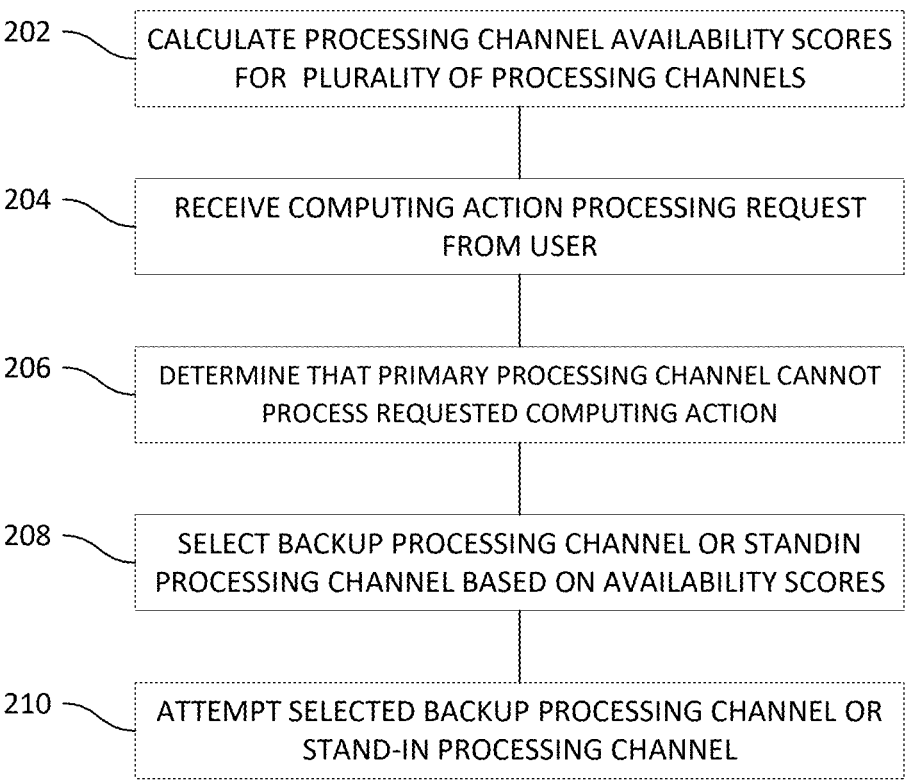

202 — CALCULATE PROCESSING CHANNEL AVAILABILITY SCORES FOR  PLURALITY OF PROCESSING CHANNELS

204 — RECEIVE COMPUTING ACTION PROCESSING REQUEST FROM USER

206 — DETERMINE THAT PRIMARY PROCESSING CHANNEL CANNOT PROCESS REQUESTED COMPUTING ACTION

208 — SELECT BACKUP PROCESSING CHANNEL OR STANDIN PROCESSING CHANNEL BASED ON AVAILABILITY SCORES

210 — ATTEMPT SELECTED BACKUP PROCESSING CHANNEL OR STAND-IN PROCESSING CHANNEL

*FIG. 2*

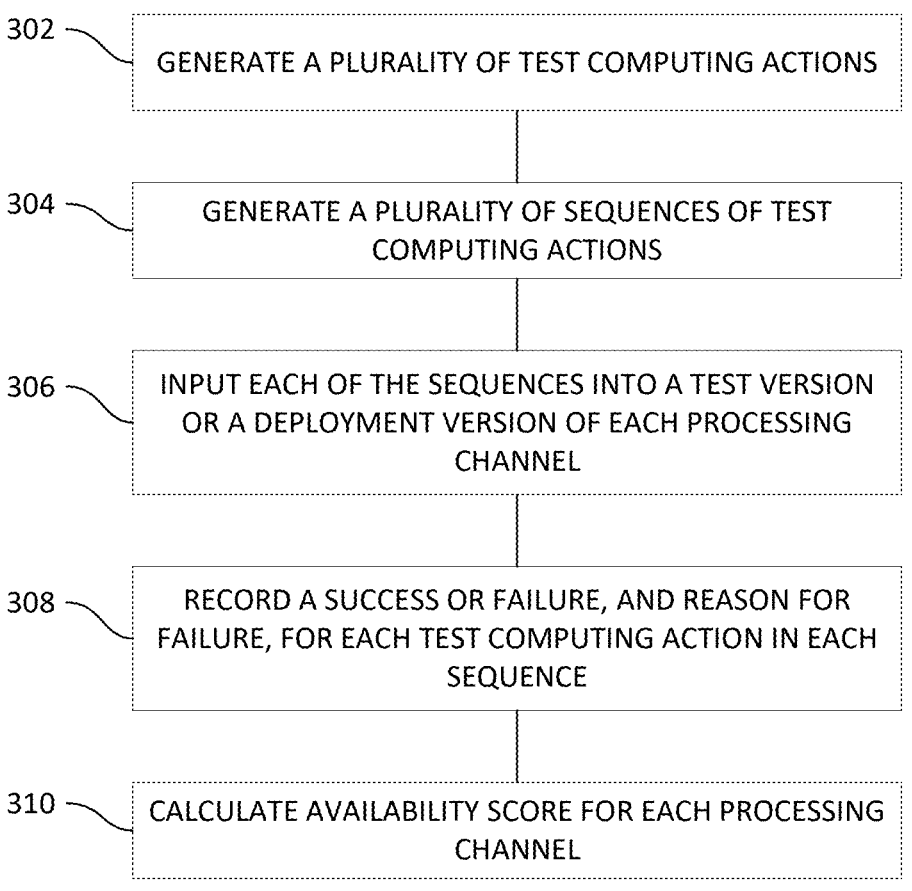

302 — GENERATE A PLURALITY OF TEST COMPUTING ACTIONS

304 — GENERATE A PLURALITY OF SEQUENCES OF TEST COMPUTING ACTIONS

306 — INPUT EACH OF THE SEQUENCES INTO A TEST VERSION OR A DEPLOYMENT VERSION OF EACH PROCESSING CHANNEL

308 — RECORD A SUCCESS OR FAILURE, AND REASON FOR FAILURE, FOR EACH TEST COMPUTING ACTION IN EACH SEQUENCE

310 — CALCULATE AVAILABILITY SCORE FOR EACH PROCESSING CHANNEL

*FIG. 3*

COMPUTING ACTION PROCESSING CHANNEL SELECTION

TECHNICAL FIELD

This disclosure relates to computer system processing failover, including determination of preferred backup processing systems for failover processing attempts.

BACKGROUND

In some processing contexts, multiple possible systems may be available for a given processing task. Depending on the task, one system may be designated as the intended primary processing system (e.g., channel), and one or more other systems may be designated as backup (e.g., secondary) processing systems. If the primary processing system is unavailable for the processing task, the processing task may be sent to a backup system for attempted processing. Routing of processing tasks to backup systems when the primary system is unavailable is known as "failover." Failover processing is successful when a backup system successfully completes the processing task. Failover processing is unsuccessful when no backup system is able to successfully complete the processing task.

BRIEF DESCRIPTION OF THE DRAWINGS

FIG. 2 is a flow chart illustrating an example method of processing a computing action.

FIG. 3 is a flow chart illustrating an example method of determining availability scores for a plurality of computing action processing channels.

DETAILED DESCRIPTION

Failover processing generally includes sending failover processing attempts to pre-arranged backup processing channels. In certain failover approaches, processing tasks are generally sent to backup channels in a defined order, without consideration for the likelihood that any given channel will successfully complete the processing task (e.g. completing the task within an acceptable service level agreement (SLA) for speed of execution). Accordingly, known failover processing techniques can be improved upon by evaluating the performance of potential backup processing channels and utilizing channels that are most likely to be successful in failover attempts (e.g. completing within SLA limits), as set forth in this disclosure.

Further, the performance of processing channels may vary from processing task to processing task, based on the circumstances of processing task requests (e.g., the volume, sequencing, transmission quality, etc. of the requests), and/or over time. Accordingly, systematically testing the performance of processing channels over a range of processing tasks, over a range of potential causes of failure, and/or over time may provide a more accurate understanding of the likelihood that a given processing system will be able to successfully process a task when acting as a backup system.

Figure 1:
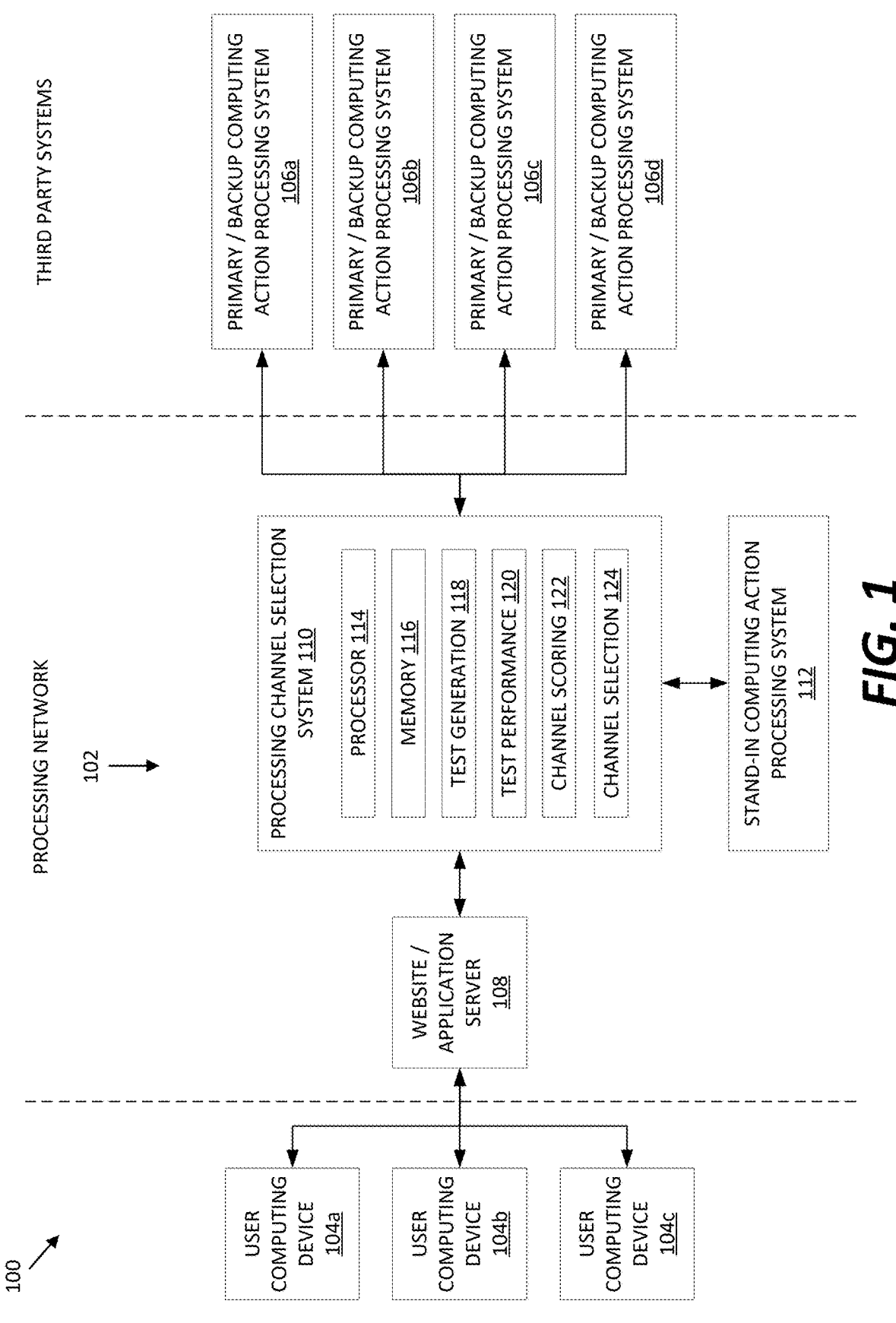
FIG. 1 is a block diagram of an example system for processing computing actions.

Referring to the drawings, wherein like numerals refer to the same or similar features in the various views, FIG. 1 is a block diagram of an example system 100 for processing computing actions. The system 100 may include a processing network 102 in communication with a plurality of user computing devices 104a, 104b, 104c and a plurality of third party systems 106a, 106b, 106c, 106d. In general, the processing network 102 may receive computing action processing requests from the user computing devices 104 and process the requested computing actions in conjunction with the third party systems 106.

Each user computing device 104 may be a mobile device, personal computer, or other computing device through which a user may transmit a computing action processing request over a network. Users may submit such requests through a website, application, or other interface on a user computing device 104. Computing action processing requests may include, for example, file transfers, financial transfers or other financial transactions, other interparty exchanges, requests to render an image or video, requests to apply a machine learning model to a data set, or another computing task that may be sent to a system separate from the user's system due to its complexity, specificity, multiparty nature, or other need for third party system involvement.

The processing network 102 may include a server 108 that hosts a website, application, or other user interface accessible by user computing devices 104, a processing channel selection system 110, and a stand-in computing action processing system 112. Users may submit (e.g., transmit) processing requests through the user computing devices 104 for processing by the processing network 102.

The processing channel selection system 110 may receive user requests for computing action processing (e.g., from user computing devices 104 via the server 108), may determine one or more appropriate processing channels for processing the request, and may facilitate such processing through the determined channels. The processing channel selection system 110 may include a processor 114 and non-transitory, computer readable memory 116 storing instructions that, when executed by the processor 114, caused the processing channel selection system 110 to perform one or more of the operations, methods, algorithms, etc. of this disclosure. The processing channel selection system 110 may further include a plurality of functional modules 118, 120, 122, 124 embodied as hardware and/or software. In some embodiments, the functional modules 118, 120, 122, 124 may be embodied as instructions stored in the memory 116.

The third-party systems may include a first computing the action processing system 106a, a second computing action processing system 106b, a third computing action processing system 106c, a fourth computing action processing system 106d, and so on. Each third party computing action processing system 106 may serve as either a primary processing channel for a given computing action or as a backup processing channel for a given computing action (e.g., as a channel for failover processing), depending on the details of the particular computing action, and depending on the relative availabilities of the various computing action processing systems 106.

The term "primary" is used herein to describe a computing action processing channel that is explicitly designated as a preferred or initial processing channel in a computing action processing request, or that is designated for a particular type of computing action processing request based on interparty agreements, where such designations are known to the processing channel selection system 110 and to the third party computing action processing systems 106. In contrast, the term "backup" is used herein to describe computing action processing channel that is explicitly designated as a secondary processing channel and a computing action processing request, or that is designated as a secondary channel for a particular type of computing action processing request based on interparty agreements. The term "processing channel" herein may refer to a computing device (or group of computing devices) configured to execute one or more types of computing tasks, and in some instances, may also include one or more network pathways and/or communication networks used to digitally exchange information. Thus in some embodiments, a "processing channel" may refer to a computer system and one or more network pathways usable to communicate with that computer system, while in another embodiment, "processing channel" may refer only to a computer system configured to execute certain tasks.

The third party computing action processing systems 106 may, relative to one another, include distinct computing resources.

In one example, where the computing actions to be processed are file transfers, the third-party computing action processing systems 106 may be separate servers or server groups, for example, through which the files may be transferred from one user to another (or otherwise from one computing device 104 to another). That is, the first computing action processing system 106a may be a first file transfer server, the second computing action processing system 106b may be a second file transfer server, and so on. Based on their respective hardware, maintenance, loads, locations, etc., the different file transfer servers 106a, 106b, 106c, 106d may perform differently from each other, and thus their expected performance may be evaluated for future file transfer routing as described herein.

In another example, where the computing actions to be processed are financial transactions, the third-party computing action processing systems 106 may be separate payment processors. For example, the first computing action processing system 106a may be VISA, the second computing action processing system 106b may be MASTERCARD, the third computing action processing system 106c may be JPMOR-GAN CHASE, the fourth computing action processing system 106d may be BANK OF AMERICA, and so on. Based on their respective hardware, maintenance, loads, locations, etc., the different payment processors 106a, 106b, 106c, 106d may perform differently from each other, and thus their expected performance may be evaluated for future financial transactions as described herein.

In another example, where the computing actions to be processed are non-transaction computing tasks, such as processing a large data set on demand (e.g., to render a complex image, to predict a future outcome based on a large amount of input data and complex algorithm, etc.), the third party computing action processing systems 106 may be different on-demand processing services—either general processing services and/or task-specific processing services. Based on their respective hardware, maintenance, loads, locations, etc., the different on-demand processing services 106a, 106b, 106c, 106d may perform differently from each other, and thus their expected performance may be evaluated for complex processing tasks as described herein.

Although FIG. 1 includes four third party computing action processing systems 106a, 106b, 106c, 106d, the teachings of the present disclosure may apply to systems having any number of third party computing action processing systems 106.

In some embodiments, the performance of one or more third party computing action processing systems 106 may change over time, as the hardware, maintenance, loads, and other aspects of those systems change. Accordingly, performance evaluations of computing action processing systems 106 may be evaluated periodically, and performance scores may be specific to a particular time period and may also change over time.

In some embodiments, the performance of one or more third party computing action processing systems 106 may be different from one type of computing action to another, or based on aspects of a sequence of computing actions processed. That is, a particular third party computing action processing system 106a, 106b, 106c, 106d may perform relatively better that other systems 106a, 106b, 106c, 106d for a particular size of computing action, a particular timing within a sequence of computing actions, and so on. Accordingly, performance evaluations of computing action processing systems 106 may be particular to types of computing actions and/or sequences of computing actions, and performance scores may be specific to a particular computing action type and may vary from one computing action type to another.

The processing network 110 may further include a stand-in computing action processing system 112, which may be or may include a substantively-equivalent processing service to the third party processing systems 106. The stand-in computing action processing system 112 may be one that is used, in standard processes, when many third party processing systems are unavailable or unsuitable for a given computing action, but where the stand-in computing action processing system 112 was not the intended processing channel in the request to process the computing action. The stand-in computing action processing system 112 may be operated or controlled by the same entity that operates or controls the server 108 and the processing channel selection system 110. As a result, processing a transaction through the stand-in computing action processing system 112 may present less risk, from a user perspective, of a failed processing attempt than processing through a third party system 106, in some embodiments.

As noted above, the processing channel selection system 110 may determine the best processing channel for a given computing action processing request. To this end, the processing channel selection system 110 may determine, in general, which of the various third party processing systems 106 (or, in some embodiments, the stand-in computing action processing system 112) is most likely to succeed in processing a particular type of computing action. Different ones of the third party computing action processing systems 106a, 106b, 106c, 106d may be more proficient than others based on, for example, a current status of the third party system 106, the details of the particular computing action to be processed, and/or other factors.

The processing channel selection system 110 may determine one or more best processing channels for one or more respective types of computing actions to be processed in a number of ways. In a first example the processing channel selection system may track the performance of each of the third party processing systems 106a, 106b, 106c, 106d over a given period of time, including respective quantities and/or percentages of successful computing actions processed and failed computing action processing attempts. Successful processing of a request may include completing their requested computing action. Failed processing of a request may include, for example, a failure to transfer an asset involved in the computing action, a failure to successfully communicate with a computing system or party involved in the computing action, the computing action processing system itself being offline or otherwise unavailable, and/or another reason for the computing action to not be completed.

Another way in which the processing channel selection system 110 may determine one or more best processing channels for one or more respective types of computing actions may be to input a plurality of test computing action sequences into each of the third party computing action processing systems 106a, 106b, 106c, 106d, and to track the quantity and/or percentage of successfully processed computing actions and failed processing by each computing action processing system 106a, 106b, 106c, 106d. To this end, the processing channel selection system 110 may include a test generation module 118, a test performance module 120, and a channel scoring module 122.

The test generation module 118 may be configured to generate a plurality of test computing actions to be input to the computing action processing systems 106, 112. Further, the test generation module 118 may be configured to generate a plurality of sequences of such test computing actions. A given test computing action sequence may include, for example, the details of each computing action in the sequence, metadata of each computing action processing request, a manner in which each test computing action is to be transmitted to the computing action processing system 106, the timing of transmission of each test computing action in the sequence, and/or other details of the test computing action processing requests and the way in which those requests would be received by a computing action processing system 106 in order to test the capabilities and robustness of the computing action processing system 106.

The test performance module 120 may be configured execute the plurality of tests generated by the test generation module 118. Executing the tests may include, for example, inputting each of a plurality of test computing action sequences to each of the computing action processing systems 106a, 106b, 106c, 106d. In some embodiments, the test performance module 120 may input the same test computing action sequences to each of the computing action processing systems 106a, 106b, 106c, 106d. Inputting a test computing action sequence to a computing action processing system 106 may include transmitting the test computing actions, in the order dictated by the sequence, and with the timing dictated by the sequence, to the computing action processing system 106. In some embodiments, the test computing actions may be transmitted to the production or deployed version of a computing action processing system 106. In some embodiments, the test computing actions may be transmitted to a sandbox environment or test environment of a computing action processing system 106, where such sandbox environment or test environment is made available by the third party that operates the computing action processing system 106 for the purposes of testing.

The test performance module 120 may, for each test computing action input to a computing action processing system 106, receive a response to the input from the computing action processing system 106. The response may indicate whether the computing action was successfully processed, and/or may include a result of the processing. Based on the response, the test performance module 120 may conclude whether each test computing action was successfully processed or not.

The channel scoring module 122 may be configured to calculate one or more respective availability scores for each of the third party computing action processing systems 106a, 106b, 106c, 106d based on the results of the test computing action sequences input to the third party computing action processing systems 106a, 106b, 106c, 106d.

For example, the availability scores may include a percentage of successful test computing actions, a percentage of successful test computing action sequences, a weighted percentage of successful test computing actions or test computing action sequences, etc. A given score may be specific to a particular type of computing action, or may be respective of all computing actions.

The test performance module 120 and channel scoring module 122 may also input test sequences to, and calculate availability scores for, the stand-in computing action processing system 112.

Once availability scores have been calculated for the computing action processing systems 106, 112, the availability scores may be used to process real-time computing action processing requests from user computing devices 104. The use of availability scores for selecting processing channels, and the selection of specific processing channels, may not be apparent to users that submit computing action processing requests through the server 108. However, the use of availability scores and selection of specific processing channels may reduce the average latency of request processing. From the perspective of the processing network 102 and the third party systems 106, the use of availability scores for selecting processing channels, and the selection of specific processing channels, may reduce instances of failed processing attempts, and thus may reduce the overall workload on the system 100 as a whole, thereby improving its efficiency.

The channel selection module 124 may be configured to receive a requested computing action to be processed and, based on the requested computing action, the respective availability scores for the third party computing action processing systems 106a, 106b, 106c, 106d and the stand-in computing action processing system 112, and a current status of each computing action processing system 106a, 106b, 106c, 106d, may select a processing channel for processing the requested computing action. For example, in some embodiments, the channel selection module 124 may select a processing channel (e.g., computing action processing system 106) indicated in the requested computing action as the primary channel, where the channel selection module 124 knows or believes that the indicated processing channel 106 is available. Where the channel selection module 124 knows or believes that the processing channel indicated in the requested computing action is not available, the channel selection module may direct the requested computing action to a processing channel with a highest availability score. Channel selection and routing of computing action processing requests according to channel availability scores is described in greater detail in connection with FIG. 2.

FIG. 2 is a flow chart illustrating an example method 200 of operating a processing network. The method 200, or one or more aspects of the method 200, may be performed by the processing channel selection system 110, and thus the method 200 may be computer-implemented, in some embodiments.

The method 200 may include, at operation 202, calculating respective processing channel availability scores for a plurality of processing channels. An example of operation 202 will be described with respect to the method 300 of FIG. 3.

The method 200 may further include, at operation 204, receiving a computing action processing request from a user. The computing action processing request may be or may include, for example, a request to complete a financial transaction, a request to transfer a file, a request to process a large data set, and/or another request. The request may indicate, in some embodiments, one or more intended processing channels for processing the requests. For example, the one or more intended processing channels may include an intended primary processing channel and one or more backup processing channels. In some embodiments, the request may include data specifically identifying the one or more intended processing channels. Additionally or alternatively, the one or more intended processing channels may have been previously associated with a source of the request or an aspect of the request. For example, where the computing action is a financial transaction involving a payment instrument, the payment instrument may be pre-associated with one or more banks or other clearance channels for processing the financial transaction. In another example, where the computing action is a file transfer, the file type, user, location of origin or destination of the file, or other aspect of the transfer may be pre-associated with a particular server or service for processing the transfer.

The request received at operation 204 may be received through a website, application, or other user interface available to the requesting user. Further, the request received at operation 204 may be received by a party that operates or is otherwise in control of the website, application, or other user interface through which the request was received. Still further, the party that receives the request at operation 204 may operate or control a processing channel for processing the requested computing action (e.g., a stand-in processing channel), in some embodiments.

The method 200 may include, at operation 206, determining that the primary computing action processing channel cannot successfully process the requested computing action. Operation 206 may include, for example, comparing a recent success rate (e.g., reliability) of the primary processing channel to a historical success rate and/or to a success rate threshold, comparing a recent latency of the primary processing channel to a historical latency and/or to a latency threshold. For example, operation 206 may include calculating a success rate for a most recent quantity of computing action processing requests (e.g., a most recent 100 requests transmitted by the system performing the method 200 to the primary processing channel) and comparing the success rate to a predetermined threshold or to a historical success rate for that processing channel (e.g., where the historical success rate is based on a quantity of processing attempts that is several orders of magnitude greater than the quantity used to calculate the recent success rate). In another example, operation 206 may include calculating an average latency for a most recent quantity of computing action processing requests (e.g., a most recent 100 requests transmitted by the system performing the method 200 to the primary processing channel) and comparing the average recent latency to a predetermined threshold or to a historical latency for that processing channel (e.g., where the historical latency is based on a quantity of processing attempts that is several orders of magnitude greater than the quantity used to calculate the recent latency). Operation 206 may include concluding that the primary processing channel is not available based on the current success rate being below the threshold, based on the current success rate being significantly less than the historical success rate, based on the average recent latency being above the latency threshold, and/or based on the average recent latency being significantly higher than the historical latency.

In some embodiments, operation 206 may include determining a primary processing channel based on characteristics of the request, such as a requesting user, a location of the requesting user, an identity or characteristic of an asset involved in the request (such as a payment instrument involved in the request, a file type involved in the request, etc.), it computing system of the requesting user, etc. For example, where the requested computing action is a file transfer between a user in the United States and a user in Canada, operation 206 may include selecting a primary processing channel that is intended for use with North American transfers. In another example, where the requested computing action is a payment on an AMERICAN EXPRESS card, operation 206 may include selecting AMERICAN EXPRESS as the primary processing channel.

In some embodiments, operation 206 may include attempting to process the requested computing action through the primary processing channel and receiving a failure from the primary computing channel. Operation 206 may include, for example, transmitting the computing action processing request to the primary processing channel. A failure may include, for example, a non-response from the primary processing channel to the transmitted request, or a failure to respond within a predetermined latency period threshold. Alternatively, a failure may include an indication from the primary processing channel that the requested computing action could not be completed or otherwise processed as requested.

The method 200 may further include, at operation 208, selecting a backup processing channel or a stand-in processing channel based on respective availability scores of a plurality of possible backup processing channels and of a stand-in processing channel. In some embodiments, operation 208 may include selecting the backup processing channel with the highest availability score. In some embodiments, operation 208 may include selecting the stand-in processing channel, where the stand-in processing channel has a higher availability score then any appropriate backup processing channel.

In some embodiments, operation 208 may include determining which of a plurality possible backup processing channels are appropriate for the requested computing action to be processed, and selecting the backup processing channel from that set of appropriate backup processing channels with the highest availability score. For example, some backup processing channels may not be capable of processing the requested computing action, and thus may not be appropriate for processing a particular requested computing action. In some embodiments, some processing channels may not be appropriate backup channels for a particular primary processing channel, and therefore selecting the backup computing action processing channel from the plurality of backup computing action processing channels may be further according to an identity of the primary computing action processing channel.

The method 200 may further include, at operation 210, attempting to process the requested computing action through the selected backup processing channel or through the stand-in processing channel. Operation 210 may include, for example, transmitting the computing action processing request to the selected backup processing channel.

If the attempt to process the requested computing action through the selected backup processing channel fails, the method may return to operation 208 to select another backup processing channel or the stand-in channel based on availability score.

In some embodiments, the method 200 may include attempting to process the requested computing action through a predetermined number of backup processing channels (e.g., one or two backup processing channels) before using the stand-in channel. In other embodiments, the method 200 may include proceeding directly to the stand-in processing channel if none of the appropriate backup processing channels has a sufficiently high availability score for the particular requested computing action. For example, the method 200 may include-determining that each of the backup computing action processing channels are associated with lower respective availability scores than the primary computing action processing channel for a given request and, in response, processing the request through the stand-in channel.

In some embodiments, the method 200 may include proceeding directly from operation 204 to operation 208 where the primary processing channel is known to be unavailable (e.g., based on a recent average latency and/or on a recent success rate).

In some embodiments, the method 200 may include transmitting health check pings to the primary processing channel (and/or all available processing channels), both when the processing channel is believed to be available and when the processing channel is believed to be unavailable. A non-response or faulty response to the health check ping may result in a conclusion that the processing channel is not available. Conversely, a correct response to the health check ping may result in a conclusion that the processing channel is available.

The method 200 may improve the reliability of network-based processing of computing actions by ensuring that, when a primary processing channel is not available, a computing action is processed by a backup processing channel that is mostly likely to be successful, thereby reducing the number of failed processing attempts. For the same reason, network-based processing of computing actions according to the method 200 may reduce the average latency of processing such requests.

FIG. 3 is a flow chart illustrating an example method 300 of determining availability scores for one or more computing action processing channels. The method 300, or one or more aspects of the method 300, may be performed by the processing channel selection system, and thus the method may be computer-implemented.

FIG. 3 illustrates an example in which availability scores are determined based on generated test computing actions, and sequences of such actions. As noted above with respect to FIG. 1, in some embodiments, an availability score may additionally or alternatively be based on real historical processing of computing actions.

The method 300 may include, at operation 302, generating a plurality of test computing action processing requests. Each test request may include respective data to be processed and the processing that is to be performed on the data. For example, where relevant computing actions include file transfers, each test computing action may include a transfer source, a transfer destination, and a file to be transferred. Where relevant computing actions include financial transactions, each test computing action may include a transferor (including one or more of an identity, address, other bibliographic information), transferee (including the same types of information as a transferor), transaction histories of the transferor and/or transferee, asset to be transferred, indication of primary processing channel, indication of one or more backup processing channels, and/or other information regarding the transaction. Where relevant computing actions include processing a large data set to determine a result (e.g., rendering a model, determining a machine learning model output, etc.), each test computing action may include a data set and an instruction for a desired output based on the data set.

In some embodiments, one test may differ from another based on the data payload differences of the test, such as the characteristics of tests set forth in the paragraph above.

In some embodiments, operation 302 may include automatically generating the test computing actions. For example, operation 302 may include applying an algorithm to generate a plurality of respective combinations of the various aspects of a test computing action, such that a given computing action is generated as a random or pseudo-random combination of data payload aspects.

The method 300 may include, at operation 304, generating a plurality of sequences of test computing actions. Each sequence may include a plurality of test computing actions generated at operation 302. In some embodiments, each sequence may include a transmission rate, a timing between transmission of particular test computing actions, and/or other details of the transmission of the test actions. In some embodiments, each sequence may include a specific order of the test computing actions in the sequence. Accordingly, the plurality of test computing action sequences generated at operation 304 may differ from one another in one or more of a rate of transmission of test computing actions, an order of the sequence, a quantity of test computing actions in the sequence, and/or one or more data payload differences of one or more of the test computing actions in the sequence.

In some embodiments, operation 304 may include generating and adding one or more error inducing transmissions to a sequence. For example, one or more of the test actions processing requests in a sequence may be designated for packets to be omitted in the transmission of the request. In another example, one or more portions of a sequence may be designated for improper response codes to be sent. Such improper response codes may include, for example, indications for the processing channel to provide certain data, where the data may be provided in a data type that is not processable by an intermediating system that is between the system performing the method 300 and the various processing channels (an example of such an intermediating system is described with respect to operation 306 below). In some embodiments, a respective failure-inducing transmission may be attached to each test computing action in a sequence. In some embodiments, operation 304 may include adding the same (or same type of) error-inducing transmission to each test computing action in a given sequence.

In some embodiments, operation 304 may include, for a given test action sequence, generating multiple versions. For example, operation 304 may include generating a first version in which error inducing transmissions are included in the sequence and a second version in which error inducing transmissions are not included in the sequence. As described below, each version may be used in a given test execution.

The plurality of test computing action sequences generated at operation 304 may differ from one another also in the error inducing transmissions of one sequence to another.

The method 300 may include, at operation 306, inputting each of the generated sequences into a test version or a deployment version of each of a plurality of processing channels. Operation 306 may include, for each test sequence, transmitting the test computing actions of the sequence to a given processing channel according to the order, transmission rate, timing, and other details of the sequence.

As noted above, operation 306 may include inputting the generated sequences into, for a given processing channel, either a test version or a deployment version of the channel. For example, in some embodiments, operation 306 may include inputting the test computing action sequences to a sandbox test environment for the processing channel. The sandbox test environment may be operated and maintained by the processing channel operator, and may exist for the purpose of stress-testing the processing channel via test computing actions, in some embodiments. As a result, crashing the sandbox test environment via a test action sequence may advantageously not affect the functionality of the processing channel itself.

In some embodiments, operation 306 may include inputting the test computing action sequences to a deployment version of a processing channel (e.g., the same version into which real computing actions are input for processing). Testing with the deployment version of the processing channel may advantageously provide more accurate results as to the capabilities (e.g., processing ability and/or latency) of the processing channel.

In some embodiments, operation 306 may include inputting a given test sequence into multiple processing channels in order to induce failure of a primary channel and then test failover to one or more backup channels. For example, for each test computing action in a sequence, a version the test action that includes one or more failure-inducing transmissions may be input to the primary processing channel. Once that test computing action fails due to the failure inducing transmission, the test computing action may be input to one or more appropriate backup processing channels without the failure-inducing transmission.

In some embodiments, operation 306 may include inputting a given test sequence into multiple processing channels in order to induce failure of a primary channel, induce a failure of at least one backup channel, and then test failover to one or more additional backup channels. For example, for each test computing action in a sequence, a version the test action that includes one or more failure-inducing transmissions may be input to the primary processing channel. Once that test computing action fails due to the failure inducing transmission, the test computing action may be input to a designated first backup channel, also with the failure-inducing transmissions. When the first backup channel also fails, the test computing action may be input to a next backup channel without the failure-inducing transmission. In this way, a processing channel may be tested as a first backup channel, as a second backup channel, as a third backup channel, and so on, by selecting the number of channels to which the failure-inducing transmissions are sent.

In some embodiments, inputting a test computing action to a given processing channel at operation 306 may include inputting that test computing action to a connector service respective of that processing channel. A connector service may execute separately from the system performing operation 306 and from the processing channel and may serve as an intermediary for data exchange between the systems. Error-inducing transmissions may induce failure within the connector service, instead of directly within the processing channel, in some embodiments. For example, where improper response codes are used to induce failure of a primary processing channel, the improper response codes may induce failed communications between the system performing operation 306 and the connector service.

The method 300 may include, at operation 308, recording a success or a failure, and a reason for each failure, for each test computing action in each test sequence. For each test computing action input to a computing action processing channel in operation 306, the processing channel may return a result, such a confirmation of successful processing, an output of the processing, and/or one or more error codes or messages that indicate why the processing request could not be completed. Alternatively, the computing action processing channel may not respond to the input test computing action. Operation 308 may include interpreting a lack of response as a failure to successfully process the input computing action.

A processing channel may fail to process a requested computing action for various reasons, and may report a reason in response to a request, in some embodiments. Operation 308 may include recording a reported reason for failure, a non-response from the processing channel, and/or a successful processing.

In some embodiments, operation 308 may include recording a success or failure for each computing action channel to which, in a given test sequence, the error-inducing transmissions were not transmitted.

An example of recorded results for a set of four test computing action processing request sequences is provided in Table 1 below:

TABLE 1

| Sequence | Request Quantity | Type of Outage | Technique | Eligible Failover Requests | Successful Failover Requests Processed |
|---|---|---|---|---|---|
| 1 | 100 | Primary Processing Channel Down | Packet loss | 80 | 60 |
| 2 | 100 | Failure Response Code to Primary Processing Channel | Altered response code fault | 90 | 70 |
| 3 | 100 | Multiple Processing Channels Down, Not Stand-in Eligible | Packet loss | 80 | 60 |
| 4 | 100 | Multiple Processing Channels Down, Stand-in Eligible | Packet loss | 80 | 50 |

Table 1 includes four test computing action sequences (numbered 1, 2, 3, 4 in the first column), each including 100 text computing action processing requests (as indicated in the second column), having been input to a particular processing channel for testing, and the results of that testing. A type of hypothetical outage is listed for each sequence in the third column, which indicates the quantity of processing channels to which failure-inducing transmissions were sent and/or whether the computing actions in the sequence were eligible for stand-in processing. For each test sequence, a particular failure inducement technique was applied (column four) as to the primary processing and channel and/or one or more backup processing channels. In "packet loss" technique sequences, packets were omitted from the transmission of one or more test action processing requests, as described above. In the "altered response code fault" sequence, the system executing the method 300 may transmit erroneous response codes to the processing channel in response to communications from the processing channel, interspersed with the transmission of the test computing action processing requests. Finally, for each sequence, table 1 indicates a quantity of the 100 respective requests that were eligible for transmission to the tested processing channel (fifth column) and the quantity of the 100 respective requests that were successfully processed by the tested processing channel (sixth column).

In the example of Table 1, operations 306 and 308 may include executing each of sequences 1, 2, 3, and 4 independently. Executing each sequence may include inputting the 100 test computing action processing requests of the sequence, including the failure inducement technique of the sequence, to a particular processing channel at operation 306. At operation 308, the success or failure of the processing channel as to each test action may be recorded. In this example, sequence 1 included 60 successful actions processed, sequence 2 included 70 successful actions processed, and so on, as indicated in the sixth column of Table 1.

The "Type of Outage" indicated in Table 1 may be tracked in order to correlate processing channel performance with outage types, in some embodiments. For example, outage-type-specific availability scores may be calculated, in some embodiments. In another example, the type of outage may affects the weighting of a sequence in calculating an availability score.

The method may include, at operation 310, calculating availability scores for each processing channel based on the successes, failures, and reasons for failure recorded at operation 308. The availability score may be calculated as a percentage, for example.

In some embodiments, the availability score may be a simple percentage score of the test computing actions that were successfully processed by the processing channel. In the example of Table 1, such a simple percentage would be $(60+70+60+50)/(100+100+100+100)=60\%$.

In some embodiments, the availability score may be a percentage score of the test computing actions that were successfully processed by the processing channel of the computing actions that were eligible for processing by the processing channel. In the example of Table 1, such a simple percentage would be $(60+70+60+50)/(80+90+80+80)=72.7\%$.

In some embodiments, the availability score may be a weighted success or failure rate for each of a plurality of failure types. In the example of Table 1, sequences 1, 2, 3, and 4 may be assigned respective weights $w_1$, $w_2$, $w_3$, $w_4$ for calculating an availability score. In an example, the weights may be applied to percentages of the test computing actions that were successfully processed $a_1$, $a_2$, $a_3$, $a_4$ by the processing channel of the computing actions that were eligible $e_1$, $e_2$, $e_3$, $e_4$ for processing by the processing channel, according to equation 1 below:

$$\text{Availability Score} = \sum_{i=0}^{i=4} w_i \frac{a_i}{e_i} \qquad \text{(Eq. 1)}$$

In the example of Table 1, equation (1) yields an availability score of 72.08%.

In an example of the method 300 utilizing the test sequences of Table 1, sequences 1, 2, 3, and 4 may be separately (and identically) input to a plurality of processing channels at operation 306. The quantity of test actions in each sequence that are eligible for failover may vary from one processing channel to another, and the quantity of test actions that are successfully processed may vary from one processing channel to another. Accordingly, the respective quantity of test actions in each sequence that are eligible for failover and the respective quantity of test actions that are successfully processed may be recorded for each processing channel at operation 308. At operation 310, equation 1 or another calculation may be applied to each processing channel to calculate a respective availability score for that processing channel.

The availability score equation of equation (1), or another weighted availability score calculation, may additionally or alternatively be applied to actual computing action processing results of a processing channel, in some embodiments. In some examples, an availability score may be calculated based on weighted failure causes in test computing action sequences and in actual historical computing actions.

Figure 4:
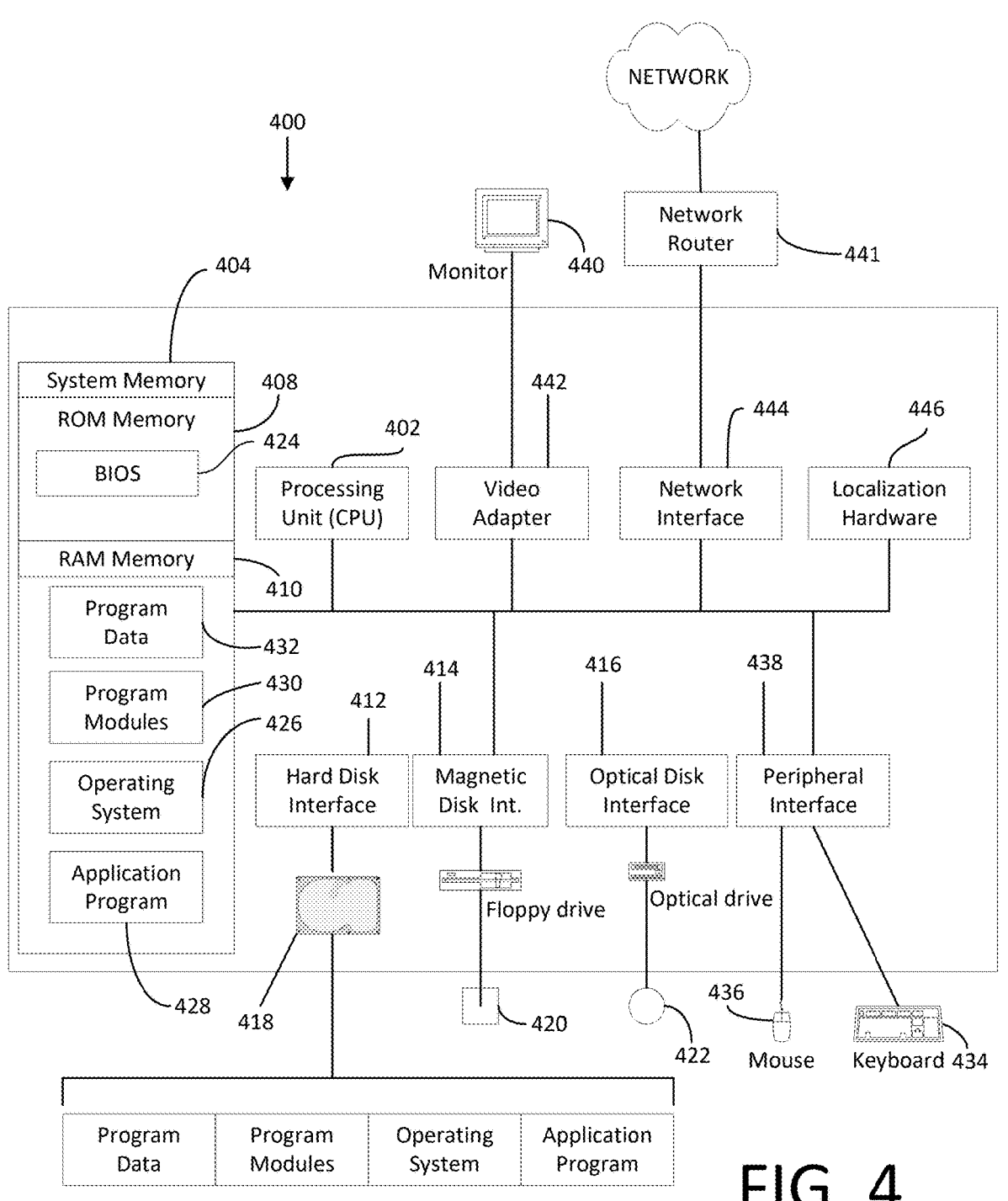
FIG. 4 is a block diagram of an example computing system.

FIG. 4 is a block diagram of an example computing system 400, such as a desktop computer, laptop, smartphone, tablet, or any other such device having the ability to execute instructions, such as those stored within a non-transient, computer-readable medium. Furthermore, while described and illustrated in the context of a single computing system 400, those skilled in the art will also appreciate that the various tasks described hereinafter may be practiced in a distributed environment having multiple computing systems 400 linked via a local or wide-area network in which the executable instructions may be associated with and/or executed by one or more of multiple computing systems 400.

In its most basic configuration, computing system environment 400 typically includes at least one processing unit 402 and at least one memory 404, which may be linked via a bus 406. Depending on the exact configuration and type of computing system environment, memory 404 may be volatile (such as RAM 410), non-volatile (such as ROM 408, flash memory, etc.) or some combination of the two. Computing system environment 400 may have additional features and/or functionality. For example, computing system environment 400 may also include additional storage (removable and/or non-removable) including, but not limited to, magnetic or optical disks, tape drives and/or flash drives. Such additional memory devices may be made accessible to the computing system environment 400 by means of, for example, a hard disk drive interface 412, a magnetic disk drive interface 414, and/or an optical disk drive interface 416. As will be understood, these devices, which would be linked to the system bus 406, respectively, allow for reading from and writing to a hard disk 418, reading from or writing to a removable magnetic disk 420, and/or for reading from or writing to a removable optical disk 422, such as a CD/DVD ROM or other optical media. The drive interfaces and their associated computer-readable media allow for the nonvolatile storage of computer readable instructions, data structures, program modules and other data for the computing system environment 400. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nanodrives, memory sticks, other read/write and/or read-only memories and/or any other method or technology for storage of information such as computer readable instructions, data structures, program modules or other data. Any such computer storage media may be part of computing system environment 400.

A number of program modules may be stored in one or more of the memory/media devices. For example, a basic input/output system (BIOS) 424, containing the basic routines that help to transfer information between elements within the computing system environment 400, such as during start-up, may be stored in ROM 408. Similarly, RAM 410, hard drive 418, and/or peripheral memory devices may be used to store computer executable instructions comprising an operating system 426, one or more applications programs 428 (which may include a browser or other application through which a user of a user computing device 104 may enter computing action processing requests), other program modules 430, and/or program data 432. Still further, computer-executable instructions may be downloaded to the computing environment 400 as needed, for example, via a network connection.

An end-user may enter commands and information into the computing system environment 400 through input devices such as a keyboard 434 and/or a pointing device 436. While not illustrated, other input devices may include a microphone, a joystick, a game pad, a scanner, etc. These and other input devices would typically be connected to the processing unit 402 by means of a peripheral interface 438 which, in turn, would be coupled to bus 406. Input devices may be directly or indirectly connected to processor 402 via interfaces such as, for example, a parallel port, game port, firewire, or a universal serial bus (USB). To view information from the computing system environment 400, a monitor 440 or other type of display device may also be connected to bus 406 via an interface, such as via video adapter 442. In addition to the monitor 440, the computing system environment 400 may also include other peripheral output devices, not shown, such as speakers and printers.

The computing system environment 400 may also utilize logical connections to one or more computing system environments. Communications between the computing system environment 400 and the remote computing system environment may be exchanged via a further processing device, such a network router 448, that is responsible for network routing. Communications with the network router 448 may be performed via a network interface component 444. Thus, within such a networked environment, e.g., the Internet, World Wide Web, LAN, or other like type of wired or wireless network, it will be appreciated that program modules depicted relative to the computing system environment 400, or portions thereof, may be stored in the memory storage device(s) of the computing system environment 400.

The computing system environment 400 may also include localization hardware 446 for determining a location of the computing system environment 400. In embodiments, the localization hardware 446 may include, for example only, a GPS antenna, an RFID chip or reader, a WiFi antenna, or other computing hardware that may be used to capture or transmit signals that may be used to determine the location of the computing system environment 400. Data from the localization hardware 446 may be included in a computing action processing request, for example.

Referring to FIGS. 1 and 4, each user computing device 104 may be a computing system 400. Additionally, one or more of the components of the computing system 400 may form the processing channel selection system 110, including the CPU 402, system memory 404, ROM 408, RAM 410, network interface 444, and storage, such as hard disk 418 or flash memory. The functional modules 118, 120, 122, 124 of the processing channel selection system 110 may be embodied as program modules 430.

In a first aspect of the present application, a computer-implemented method is provided that includes calculating a respective availability score for each of a plurality of backup computing action processing channels based on respective responses of the plurality of backup computing action processing channels to one or more of a plurality of test computing actions or a plurality of historical computing actions, receiving, by a computing system, a requested computing action from a user, determining, by the computing system, that a primary computing action processing channel cannot successfully process the requested computing action within one or more of a reliability threshold or a latency threshold, in response to determining that the primary computing action processing channel cannot successfully process the requested computing action, selecting, by the computing system, a backup computing action processing channel from the plurality of backup computing action processing channels according to the availability scores, and transmitting, by the computing system, the requested computing action to the selected backup computing action processing channel.

In an embodiment of the first aspect, calculating the respective availability score for each of the plurality of backup computing action processing channels includes generating, by a test computing system, a plurality of test computing action sequences, for each of the plurality of backup computing action processing channels, inputting the plurality of test computing action sequences to a version of the backup computing action processing channel, and receiving a success or a failure from the backup computing action processing channel version for each test computing action sequence, wherein the availability score is based on a quantity of success and a quantity of failures for the test computing action sequences. In a further embodiment of the first aspect, one or more of the version of the backup computing action processing channel is, for at least one of the plurality of backup computing action processing channels, a sandbox test environment for the backup computing action processing channel, or the version of the backup computing action processing channel is, for at least one of the plurality of backup computing action processing channels, a deployed version of the backup computing action processing channel. In a further embodiment of the first aspect, the plurality of test computing action sequences differ from one another in one or more of a rate of transmission of test computing actions, an order of the sequence, a quantity of test computing actions in the sequence, or one or more data payload differences of one or more of the test computing actions in the sequence.

In an embodiment of the first aspect, determining that the primary computing action processing channel cannot successfully process the requested computing action within one or more of a reliability threshold or a latency threshold includes one or more of comparing a successful processing rate of a recent plurality of computing actions processed by the primary computing action processing channel to the reliability threshold and determining that the success rate is below the reliability threshold, or comparing an average latency of a recent plurality of computing actions processed by the primary computing action processing channel to the latency threshold and determining that the average latency is above the latency threshold.

In an embodiment of the first aspect, the method further includes receiving, by the computing system, a failure from the selected backup computing action processing channel for the requested computing action, selecting, by the computing system, a third backup computing action processing channel from the plurality of backup computing action processing channels according to the availability scores, and transmitting, by the computing system, the requested computing action to the selected third backup computing action processing channel.

In an embodiment of the first aspect, selecting the backup computing action processing channel from the plurality of backup computing action processing channels is further according to an identity of the primary computing action processing channel.

In an embodiment of the first aspect, calculating the respective availability score for each of a plurality of backup computing action processing channels includes calculating a respective weighted failure rate for each of a plurality of failure types.

In an embodiment of the first aspect, the primary computing action processing channel is a third party channel with respect to the computing system, the plurality of backup computing action processing channels are third party channels with respect to the computing system, the calculating includes calculating a respective availability score for the primary computing action processing channel, the requested computing action is a first requested computing action, and the method further includes receiving a second requested computing action, determining, by the computing system, that the primary computing action processing channel cannot successfully process the second requested computing action, determining, by the computing system, that each of the backup computing action processing channels are associated with lower respective availability scores than the primary computing action processing channel and, in response, causing the second requested computing action to be processed through a computing network under common control with the computing system.

In a second aspect of the present disclosure, a computing network is provided that includes a processing channel selection computing system configured to receive a requested computing action from a user, transmit the requested computing action to a primary computing action processing channel and, in response, receive a failure from the primary computing action processing channel, in response to receiving the failure from the primary computing action processing channel, select a backup computing action processing channel from a plurality of backup computing action processing channels according to respective availability scores associated with the backup computing action processing channels, each respective availability score based on a weighted failure rate for each of a plurality of failure types in test computing action sequences, and transmit the requested computing action to the selected backup computing action processing channel.

In an embodiment of the second aspect, the requested computing action is a first requested computing action and the primary computing action processing channel is a first primary computing action processing channel, the computing network further including a computing action processing system configured to process a requested computing action and under common control with the processing channel selection computing system, wherein the processing channel selection computing system is further configured to receive a second requested computing action from a user, determine that a second primary computing action processing channel cannot successfully process the second requested computing action, determine that the respective availability scores for each of the backup computing action processing channels is worse than an availability score associated with the computing action processing system and, in response, transmit the second requested computing action to the computing action processing system.

In an embodiment of the second aspect, the computing network further includes a computing action processing system configured to process a requested computing action and under common control with the processing channel selection computing system, wherein the processing channel selection computing system is further configured to receive a failure from the selected backup computing action processing channel in response to transmitting the requested computing action to the selected backup computing action processing channel, and transmit the requested computing action to the computing action processing system in response to receiving the failure from the selected backup computing action processing channel.

In an embodiment of the second aspect, an identity of the primary computing action processing channel is specified in the requested computing action.

In a third aspect of the present disclosure, a computer-implemented method is provided that includes generating, by a test computing system, a plurality of test computing action sequences, for each of the plurality of backup computing action processing channels, inputting the plurality of test computing action sequences to a first version of the backup computing action processing channel, and receiving a success or a failure from the backup computing action processing channel version for each test computing action sequence, wherein the availability score is based on a quantity of success and a quantity of failures for the test computing action sequences, and causing a user-requested computing action to be processed through a second version of one of the backup computing action processing channels in response to a primary computing action processing channel specified in the user request being unable to process the user-requested computing action.

In an embodiment of the third aspect, the first version of the selected backup computing action processing channel is a sandbox test environment for the selected backup computing action processing channel, and the second version of the selected backup computing action processing channel is a deployed version of the selected backup computing action processing channel.

In an embodiment of the third aspect, the first and second versions of the selected backup computing action processing channel are a deployed version of the selected backup computing action processing channel.

In an embodiment of the third aspect, each respective first version of the plurality of backup computing action processing channels is a respective sandbox test environment for the backup computing action processing channel.

In an embodiment of the third aspect, the plurality of test computing action sequences differ from one another in one or more of a rate of transmission of test computing actions, an order of the sequence, or a quantity of test computing actions in the sequence.

In an embodiment of the third aspect, the plurality of test computing action sequences differ from one another in one or more details of one or more of the test computing actions in the sequence, wherein at least one of the test computing actions in the sequence is missing information that is included in others of the test computing actions in the sequence and that is useful for processing the test computing action.

In an embodiment of the third aspect, the availability score is based on a quantity of success and a quantity of failures for the test computing action sequences that is weighted based on failure type.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various presently disclosed embodiments. It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

What is claimed is:

1. A computer-implemented method comprising:

calculating a respective availability score for each of a plurality of backup computing action processing channels based on respective responses of the plurality of backup computing action processing channels to one or more of a plurality of test computing actions or a plurality of historical computing actions;

receiving, by a computing system, a requested computing action from a user;

determining, by the computing system, that a primary computing action processing channel cannot successfully process the requested computing action within one or more of a reliability threshold or a latency threshold;

in response to determining that the primary computing action processing channel cannot successfully process the requested computing action, selecting, by the computing system, a backup computing action processing channel from the plurality of backup computing action processing channels according to the availability scores; and transmitting, by the computing system, the requested computing action to the selected backup computing action processing channel.

2. The computer-implemented method of claim 1, wherein calculating the respective availability score for each of the plurality of backup computing action processing channels comprises:

generating, by a test computing system, a plurality of test computing action sequences;

for each of the plurality of backup computing action processing channels:

inputting the plurality of test computing action sequences to a version of the backup computing action processing channel; and receiving a success or a failure from the backup computing action processing channel version for each test computing action sequence;

wherein the availability score is based on a quantity of success and a quantity of failures for the test computing action sequences.

3. The computer-implemented method of claim 2, wherein one or more of:

the version of the backup computing action processing channel is, for at least one of the plurality of backup computing action processing channels, a sandbox test environment for the backup computing action processing channel; or the version of the backup computing action processing channel is, for at least one of the plurality of backup computing action processing channels, a deployed version of the backup computing action processing channel.

4. The computer-implemented method of claim 2, wherein the plurality of test computing action sequences differ from one another in one or more of:

a rate of transmission of test computing actions;

an order of the sequence;

a quantity of test computing actions in the sequence; or one or more data payload differences of one or more of the test computing actions in the sequence.

5. The computer-implemented method of claim 1, wherein determining that the primary computing action processing channel cannot successfully process the requested computing action within one or more of a reliability threshold or a latency threshold comprises one or more of:

comparing a successful processing rate of a recent plurality of computing actions processed by the primary computing action processing channel to the reliability threshold and determining that the success rate is below the reliability threshold; or comparing an average latency of a recent plurality of computing actions processed by the primary computing action processing channel to the latency threshold and determining that the average latency is above the latency threshold.

6. The computer-implemented method of claim 1, further comprising:

receiving, by the computing system, a failure from the selected backup computing action processing channel for the requested computing action;

selecting, by the computing system, a third backup computing action processing channel from the plurality of backup computing action processing channels according to the availability scores; and transmitting, by the computing system, the requested computing action to the selected third backup computing action processing channel.

7. The computer-implemented method of claim 1, wherein selecting the backup computing action processing channel from the plurality of backup computing action processing channels is further according to an identity of the primary computing action processing channel.

8. The computer-implemented method of claim 1, wherein calculating the respective availability score for each of a plurality of backup computing action processing channels comprises calculating a respective weighted failure rate for each of a plurality of failure types.

9. The computer-implemented method of claim 1, wherein:

the primary computing action processing channel is a third party channel with respect to the computing system;

the plurality of backup computing action processing channels are third party channels with respect to the computing system;

the calculating comprises calculating a respective availability score for the primary computing action processing channel;

the requested computing action is a first requested computing action; and the method further comprises:

receiving a second requested computing action;

determining, by the computing system, that the primary computing action processing channel cannot successfully process the second requested computing action;

determining, by the computing system, that each of the backup computing action processing channels are associated with lower respective availability scores than the primary computing action processing channel and, in response, causing the second requested computing action to be processed through a computing network under common control with the computing system.

10. A computing network comprising:

a processing channel selection computing system configured to:

receive a requested computing action from a user;

transmit the requested computing action to a primary computing action processing channel and, in response, receive a failure from the primary computing action processing channel;

in response to receiving the failure from the primary computing action processing channel, select a backup computing action processing channel from a plurality of backup computing action processing channels according to respective availability scores associated with the backup computing action processing channels, each respective availability score based on a weighted failure rate for each of a plurality of failure types in test computing action sequences; and transmit the requested computing action to the selected backup computing action processing channel.

11. The computing network of claim 10, wherein the requested computing action is a first requested computing action and the primary computing action processing channel is a first primary computing action processing channel, the computing network further comprising:

a computing action processing system configured to process a requested computing action and under common control with the processing channel selection computing system;

wherein the processing channel selection computing system is further configured to:

receive a second requested computing action from a user;

determine that a second primary computing action processing channel cannot successfully process the second requested computing action;

determine that the respective availability scores for each of the backup computing action processing channels is worse than an availability score associated with the computing action processing system and, in response, transmit the second requested computing action to the computing action processing system.

12. The computing network of claim 10, further comprising:

a computing action processing system configured to process a requested computing action and under common control with the processing channel selection computing system;

wherein the processing channel selection computing system is further configured to:

receive a failure from the selected backup computing action processing channel in response to transmitting the requested computing action to the selected backup computing action processing channel; and transmit the requested computing action to the computing action processing system in response to receiving the failure from the selected backup computing action processing channel.

13. The computing network of claim 10, wherein an identity of the primary computing action processing channel is specified in the requested computing action.

14. A computer-implemented method comprising:

generating, by a test computing system, a plurality of test computing action sequences;

for each of the plurality of backup computing action processing channels:

inputting the plurality of test computing action sequences to a first version of the backup computing action processing channel; and receiving a success or a failure from the backup computing action processing channel version for each test computing action sequence;

wherein the availability score is based on a quantity of success and a quantity of failures for the test computing action sequences; and causing a user-requested computing action to be processed through a second version of one of the backup computing action processing channels in response to a primary computing action processing channel specified in the user request being unable to process the user-requested computing action.

15. The computer-implemented method of claim 14, wherein:

the first version of the selected backup computing action processing channel is a sandbox test environment for the selected backup computing action processing channel; and the second version of the selected backup computing action processing channel is a deployed version of the selected backup computing action processing channel.

16. The computer-implemented method of claim 14, wherein the first and second versions of the selected backup computing action processing channel are a deployed version of the selected backup computing action processing channel.

17. The computer-implemented method of claim 14, wherein each respective first version of the plurality of backup computing action processing channels is a respective sandbox test environment for the backup computing action processing channel.

18. The computer-implemented method of claim 14, wherein the plurality of test computing action sequences differ from one another in one or more of:

a rate of transmission of test computing actions;

an order of the sequence; or a quantity of test computing actions in the sequence.

19. The computer-implemented method of claim 14, wherein the plurality of test computing action sequences differ from one another in one or more details of one or more of the test computing actions in the sequence, wherein at least one of the test computing actions in the sequence is missing information that is included in others of the test computing actions in the sequence and that is useful for processing the test computing action.

20. The computer-implemented method of claim 14, wherein the availability score is based on a quantity of success and a quantity of failures for the test computing action sequences that is weighted based on failure type.

\*   \*   \*   \*   \*